United States Patent Office 3,459,793
Patented Aug. 5, 1969

3,459,793
PREPARATION OF METHYL AMINO DI(METHYL-ENEPHOSPHONIC ACID)
Chung Yu Shen, St. Louis, Mo., and Steven J. Fitch, Baltimore, Md., assignors to Monsanto Company, St. Louis, Mo., a corporation of Delaware
No Drawing. Filed Mar. 4, 1966, Ser. No. 531,754
Int. Cl. C07f 9/08
U.S. Cl. 260—502.5                          4 Claims

ABSTRACT OF THE DISCLOSURE

The present invention relates to and covers a process for preparing methyl amino di(methylene phosphonic acid) by reacting in an aqueous medium formaldehyde, orthophosphorous acid, ammonia at a temperature above about 90° C. and a pH below about 3. The particular ammonia to orthophosphorous acid molar ratio is 0.5:1 to 5:1 and the molar ratio of formaldehyde to orthophosphorous acid is 1:1 to 2.5:1. The resultant reaction medium is relatively free of halide ions and contains less than about 60° by weight of water.

---

This invention relates to processes for preparing organophosphorous compounds. More particularly, it relates to a novel process for producing methyl amino di(alkylene phosphonic acid) in high yields from relatively inexpensive and common raw materials.

There has been reported a method for producing an alkyl amino di(alkylenephosphonic acid) by reacting a primary alkyl amine, formaldehyde and orthophosphorous acid under controlled reaction conditions of temperature, concentration, pH and reactant ratios and preferably in the presence of halide catalyst. This method requires the appropriate primary alkyl amine such as methyl amine as a raw material to produce the corresponding methyl amino di(alkylenephosphonic acid). In most instances methyl amine is a more expensive and less common law material than ammonia. It is believed, therefore, a process for producing methyl amino di(methylenephosphonic acid) in high yields and utilizing ammonia as a reactant would be an advancement in this art.

It is, therefore, an object of this invention to provide a novel process for the production of methyl amino di(methylenephosphonic acid).

It is an additional object of this invention to provide a novel process for the production of methyl amino di(methylenephosphonic acid) in high yields from relatively common and inexpensive raw materials.

Other objects of this invention will be apparent to those skilled in the art from the detailed description following.

In accordance with this invention, methyl amino di(methylenephosphonic acid) is produced by reacting ammonia, formaldehyde and orthophosphorous acid in an aqueous medium under controlled conditions; in particular, at temperatures above about 90° C., at a pH below about 3 and a molar ratio of ammonia to orthophosphorous acid of greater than about 0.5:1 and at molar ratios of formaldehyde to orthophosphorous acid of greater than about 1:1. By following the teachings of the present invention, high yields, that is, yields of methyl amino di(methylenephosphonic acid) of greater than 50% based upon the phosphorus content of the orthophosphorous acid source can be achieved. Quite unexpectedly it was found that the reaction should preferably be carried out in a relatively halide-free medium. Moreover, it was unexpectedly found that certain catalysts can be advantageously employed in the process of the present invention.

In the process of this invention, a molar excess of ammonia is necessary and a molar excess of formaldehyde is preferred. By "molar excess amounts" it is meant amounts in excess of the theoretical amount to stoichiometrically balance the following equation:

$$NH_3 + 3CH_2O + 2H_3PO_3 \rightarrow CH_3-N-(CH_2-PO_3H_2)_2$$

Thus, in theory, it would require a molar ratio of ammonia to formaldehyde to orthophosphorous acid of 1:3:2, respectively, to produce methyl amino di(methylenephosphonic acid). It is possible to produce methyl amino di(methylenephosphonic acid) in high yields with any molar ratio of ammonia to orthophosphorous acid greater than about 0.5:1 and with any molar ratio of formaldehyde to orthophosphorous acid greater than about 1:1. It is preferred, however, to use molar ratios of ammonia to orthophosphorous acid from greater than about 0.6:1 to about 1:1; however, higher molar ratios can be used, that is, molar ratios of about 1:1, 2:1, and 3:1, and even as high as 5:1 if the presence of ammonium salts in the finished product is acceptable. (It is rarely, if ever, advantageous to use a molar ratio greater than about 1:1.) It is preferred to use a formaldehyde to acid molar ratio of greater than about 1.3:1, and a molar ratio of from about 1.8:1 to 2.5:1 is especially preferred.

The ammonia source for use in the practice of this invention can be obtained from ammonia, which is preferred, or from any ammonium salt which will yield an ammonium ion in an aqueous solution and at least 5 grams of which will dissolve in 100 milliliters of water at 20° C. Nonlimiting examples of useful ammonium salts include ammonium sulfate, ammonium sulfite, ammonium carbonate, ammonium acid sulfite, ammonium phosphate, ammonium phosphite, ammonium nitrite, ammonium nitrate and mixtures thereof. If an ammonium salt is used, it is preferred to use ammonium sulfate, ammonium sulfite, or mixtures thereof since the sulfate and sulfite ions are beneficial catalysts in the formation of methyl amino di(methylenephosphonic acid) as will be described more fully hereinafter. It is further preferred (as detailed hereinafter) that the presence of a chloride ion is to be avoided whenever possible. Therefore, if ammonium chloride is used, it is preferred to use it in relatively minor amounts and generally with another source of ammonia so as not to yield a chloride ion concentration greater than about 0.5% by weight of the reactants charged. When an ammonium salt which is a generally recognized oxidizing agent such as ammonium nitrate is used, it is generally preferred to prepare a solution of the salt and formaldehyde and add the orthophosphorous acid to this solution at reaction temperatures to minimize the oxidation of orthophosphorous acid. Generally, it is preferred to use nonoxidizing ammonium salts, if available.

It is to be noted that although orthophosphorous acid is preferred in the practice of this invention, it is possible, if desired, to form the orthophosphorous acid in the reaction medium, that is, by using any water soluble inorganic salt particularly the alkali metal (such as sodium, potassium, and lithium) salts and ammonium salts of the acid and acidifying such salt to form orthophosphorous acid by a strong mineral acid such as sulfuric acid. For example, sodium phosphite can be added to the reaction medium in order to form orthophosphorous acid when acidified by sulfuric acid.

It is preferred in the practice of this invention to conduct the reaction in a relatively concentrated aqueous medium, that is, an aqueous medium containing less than about 60% by weight and preferably less than 50% by weight of water based upon the total weight of the reaction mass; that is, water, reactants, and products of the reactants. Aqueous media containing greater than about 60% by weight of water results in excessive formation of undesirable by-products. Although the reaction will proceed with only slight amounts of water such as 5% by weight, it is preferred to have from about 10% to about 50% by weight of water present in the reaction mass to enable better agitation, material handling, and the like.

As mentioned previously, it is necessary to conduct the reaction above about 90° C. In most instances about 2 to about 18 hours at temperatures above about 90° C. will be sufficient to produce the desired product. It is generally preferred to hold the temperature of the reaction medium at about atmospheric reflux temperature, although in some instances the reaction vessel can be pressurized to permit higher temperatures, if desired. It is to be noted that, although higher temperatures can be used, long reaction times at extremely high temperatures can result in decomposition and/or formation of undesired by-products. In a batch type reactor, it is generally preferred to conduct the reaction at a temperature of from about 90° C. to the atmospheric reflux temperature. It has been found that in most instances the atmospheric reflux temperature will range from about 100° C. to about 115° C.

As previously mentioned, the yields of methyl amino di(methylenephosphonic acid) are adversely affected by the presence of halide ions (particularly chloride ions); therefore, it is preferred to conduct the reaction in a "relatively halide ion free" reaction medium, unless mixtures of methyl amino di(methylenephosphonic acid) and amino tri(methylenephosphonic acid) are acceptable. By "relatively halide ion free," as used herein, it is meant that the halide ion content in the reaction medium is below about 0.5% by weight based upon the weight of reactants. It is preferred, however, that the concentration of halide ion be below about 0.1% by weight.

Although the process of this invention can be conducted without the presence of a catalyst, it is preferred to use a catalyst which will dissolve in water to form an ion selected from the group consisting of sulfate and sulfite such as sulfuric acid, ammonium sulfate, ammonium sulfite, alkali metal sulfates, alkali metal sulfites, and the like. Although the function of the catalyst is not known with certainty, it is believed that at least part of its effectiveness is due to the prevention of the oxidation of orthophosphorous acid to orthophosphoric acid. It has also been found that the presence of alkali metal ions promotes the formation of methyl amino di(methylenephosphonic acid). It is, therefore, preferred that the catalyst be an alkali metal sulfate or sulfite, such as sodium sulfate, sodium sulfite, potassium sulfate, potassium sulfite, and the like. The effective amount of catalyst has generally been found to be from about 0.04% to about 10% by weight of the total reaction medium (including the water) although larger amounts, in some instances, that is, up to about 20% can be used. Amounts above about 20% by weight are not usually beneficial and needlessly add cost to the process. Therefore, it is generally preferred to use from about 0.1% to about 5% of the catalyst.

It has also been found that a relatively low pH of the reaction medium under reaction conditions is necessary in the process of this invention. More particularly, pH values of below about 3 have been found to be necessary to prevent execessive oxidation of the orthophosphorous acid so as to enable major amounts of methyl amino di-(methylenephosphonic acid) to be formed. In most cases the pH will be below 3 because of the orthophosphorous acid used and the acid that is formed; however, in some cases such as when large amounts of salts are present either as a catalyst or as an ammonia or orthophosphorous acid source, the pH can be above 3 unless it is adjusted with another acid. In general, any strong inorganic acid which will adjust the pH below about 3 can be used, if adjustment is needed. It is to be noted, however, that since the presence of halide ions are detrimental, hydrochloric acid, if used, should only be used in minimum amounts so as to avoid the excessive concentration of halide ions as specified herein. Moreover, the inorganic acids, that are oxidizing agents such as nitric acid and the like, are to be avoided, if possible, due to their detrimental effect. Although any of the strong inorganic acids such as sulfuric, sulfurous, nitrous, boric acids, oleum, and the like can be used, it is preferred to use those acids which yield a sulfate and/or sulfite ion in the reaction medium because of the catalytic effect of such ions. Therefore sulfuric acid, sulfurous acid, and oleum are generally preferred; of these, sulfuric acid is especially preferred. The amount of acid required for adjusting the pH will be dependent upon the reactants and the catalysts used.

As long as the reaction medium is below about 90° C., the order of addition of reaction materials is not critical. Therefore all reactants can be mixed together and then heated to a temperature of above about 90° C. Another method which can be used is to prepare an aqueous solution of the orthophosphorous acid and ammonia, heat to 90° C., and quickly add the formaldehyde to the foregoing solution. However, since molar ratios of at least 2:1 of formaldehyde to orthophosphorous acid are preferable, it is preferred to prepare an aqueous solution of ammonia and formaldehyde, heat to above 90° C. and then add to the foregoing heated solution the orthophosphorous acid over a period of time.

The desired product, methyl amino di(methylenephosphonic acid), a normally crystalline material, can be separated from the reaction medium, if desired, by any conventional means such as evaporation, crystallization, and the like.

To more fully illustrate the invention, the following nonlimiting examples are presented. All parts and percentages are by weight unless otherwise indicated.

Example 1

About 70 parts of a 29% aqueous ammonia solution, about 332 parts of a 37% aqueous formaldehyde solution, about 164 parts of crystalline orthophosphorous acid and about 3 parts of sodium sulfate are charged into a reaction vessel equipped with a stirrer.

The reactant mixture is heated to about reflux temperature (105–115° C.) and held for about 2 hours with stirring. The products are then cooled to ambient temperature. The yield of methyl amino di(methylenephosphonic acid) is calculated to be about 72% based upon phosphorous by using $P^{31}$ nuclear magnetic resonance (N.M.R.). This product is recovered by filtering the reaction mass and drying the filter cake at about 120° C.

Example 2

About 290 parts of a 37% aqueous formaldehyde solution, and about 4 parts of sodium sulfate are charged to a reaction vessel equipped with a stirrer. After thoroughly mixing, about 30 parts of ammonia gas are absorbed in the aqueous medium. About 246 parts of crystalline orthophosphorous acid are added to the ammonia-formaldehyde solution. The temperature is raised to 90° C. and the pH is adjusted to about 2 with sulfuric acid. After the temperature has been above about 90° C. for 2 hours, about 32.5 parts of a 37% aqueous formaldehyde solution is added. The mixture is refluxed for an additional 4 hours and then cooled to ambient temperature. A yield of about 54% of methyl amino di(methylenephosphonic acid) based upon the phosphorus charged to the reaction is achieved.

Example 3

About 70 parts of ammonium sulfate, about 202 parts of a 37% aqueous formaldehyde solution are charged into a heated vessel equipped with an agitator. After the components are heated to about 90° C. about 140 parts of 70% orthophosphorous acid are charged. The pH of the reaction medium is below about 2.0, and the materials are kept at reflux temperature under agitation for about one hour and then allowed to cool to about 30° C. and sampled for analysis. The $P^{31}$ N.M.R. analysis indicates a yield of methyl amino di(methylenephosphonic acid) based upon the phosphorus charged of about 63%.

Example 4

About 180 parts of water, about 66 parts of ammonium sulfate, about 58 parts of ammonium sulfite, about 145 parts of para-formaldehyde, and 3 parts of sodium sulfite are charged into a heated vessel equipped with an agitator. After the components are heated to about 90° C., about 235 parts of 70% orthophosphorous acid are charged. The materials are kept at reflux temperature of from about 100 to 115° C. for about 4 hours under agitation, then allowed to cool to about 30° C. The yield of methyl amino di(methylenephosphonic acid) based upon the phosphorus charged is greater than about 60%.

What is claimed is:

1. A process for preparing methyl amino di(methylene phosphonic acid) comprising reacting in an aqueous medium formaldehyde, orthophosphorous acid and ammonia in the presence of a catalytic amount of an ion selected from the group consisting of sulfate, sulfite, and mixtures thereof, at a temperature of above about 90° C., and a pH below about 3, the molar ratio of ammonia to orthophosphorous acid being from about 0.6:1 to about 1:1 and the molar ratio of formaldehyde to orthophosphorous acid being from about 1.8:1 to about 2.5:1, the resultant reaction medium being relatively halide ion free and containing less than about 60% by weight of water.

2. A process according to claim 1 wherein said reaction is carried out in the presence of a catalytic amount of a material selected from the group consisting of alkali metal sulfates, alkali metal sulfites, sulfuric acid, and mixtures thereof.

3. A process according to claim 2 wherein said catalyst is sodium sulfite.

4. A process according to claim 2 wherein said catalyst is sodium sulfate.

References Cited

UNITED STATES PATENTS 3,288,846   11/1966   Iran et al. _____ 260—502.5

FOREIGN PATENTS 1,342,412   9/1963   France.

OTHER REFERENCES

Degering: "Organic Nitrogen Compounds," (1945) p. 202, QD251D4.

Werner: "J. Chem. Soc.," vol. III (1917), pp. 844 to 853, QD1C6.

LEON ZITVER, Primary Examiner

J. E. EVANS, Assistant Examiner